United States Patent
Huisingh et al.

(10) Patent No.: US 7,097,225 B2
(45) Date of Patent: Aug. 29, 2006

(54) TRANSPARENT VEHICLE ROOF WITH ARRANGEMENT FOR RECEIVING ARTICLES

(75) Inventors: Jack Huisingh, Holland, MI (US); Dale Gort, Holland, MI (US)

(73) Assignee: Johnson Controls Technology Company, Holland, MI (US)

( * ) Notice: Subject to any disclaimer, the term of this patent is extended or adjusted under 35 U.S.C. 154(b) by 51 days.

(21) Appl. No.: 10/520,319

(22) PCT Filed: Aug. 26, 2003

(86) PCT No.: PCT/US03/26995

§ 371 (c)(1),
(2), (4) Date: Jan. 4, 2005

(87) PCT Pub. No.: WO2004/020249

PCT Pub. Date: Mar. 11, 2004

(65) Prior Publication Data

US 2005/0258663 A1 Nov. 24, 2005

Related U.S. Application Data

(60) Provisional application No. 60/406,243, filed on Aug. 27, 2002.

(51) Int. Cl.
*B60N 3/12* (2006.01)

(52) U.S. Cl. .................. 296/37.7; 296/37.8

(58) Field of Classification Search ........... 296/37.7, 296/37.8, 210, 215; 224/309, 310, 311

See application file for complete search history.

(56) References Cited

U.S. PATENT DOCUMENTS

| 1,674,340 | A |   | 6/1928 | Nock |
|-----------|---|---|--------|------|
| 2,120,619 | A | * | 6/1938 | Matthiesen ............. 224/311 |
| 2,193,607 | A | * | 3/1940 | Votypka ................ 296/215 |
| 2,929,539 | A |   | 3/1960 | Safreno |
| 3,451,035 | A |   | 6/1969 | Baldwin |
| 3,474,381 | A |   | 10/1969 | Baldwin |

(Continued)

FOREIGN PATENT DOCUMENTS

DE          23 59 718          6/1975

(Continued)

OTHER PUBLICATIONS

"Innovation in the most pleasing form!", *Automotive & Transportation Interiors*, a Publication of Shore-Varrone, Inc., Nov. 1998, (1 pg.).

*Primary Examiner*—Kiran B. Patel
(74) *Attorney, Agent, or Firm*—Foley & Lardner LLP

(57) ABSTRACT

An overhead system for a vehicle includes a generally transparent panel covering a portion of the roof area of the vehicle, and at least one elongated member coupled to at least one of the generally transparent panel and a structural portion of the vehicle. A system for attaching articles to an overhead portion of an interior of a vehicle includes a generally transparent panel covering a portion of a roof of the vehicle, with at least one elongated member engaging the generally transparent panel, and at least one article adapted for mounting to the elongated member.

16 Claims, 4 Drawing Sheets

U.S. PATENT DOCUMENTS

| | | | |
|---|---|---|---|
| 3,984,161 A | 10/1976 | Johnson | |
| 4,173,382 A | 11/1979 | Booty | |
| 4,182,532 A | 1/1980 | Walker, Sr. | |
| 4,441,641 A | 4/1984 | Thompson | |
| 4,469,365 A | 9/1984 | Marcus et al. | |
| 4,738,481 A * | 4/1988 | Watjer et al. | 296/37.8 |
| 4,852,938 A * | 8/1989 | Hirshberg et al. | 296/214 |
| 4,867,498 A * | 9/1989 | Delphia et al. | 296/37.7 |
| 4,887,196 A | 12/1989 | Brown et al. | |
| 4,974,129 A | 11/1990 | Grieb et al. | |
| 5,029,937 A * | 7/1991 | Yamamoto | 296/223 |
| 5,040,990 A | 8/1991 | Suman et al. | |
| 5,077,643 A | 12/1991 | Leach | |
| 5,085,481 A | 2/1992 | Fluharty et al. | |
| 5,113,318 A | 5/1992 | Conley | |
| 5,128,847 A | 7/1992 | Lin et al. | |
| 5,154,617 A | 10/1992 | Suman et al. | |
| 5,180,089 A | 1/1993 | Suman et al. | |
| 5,285,941 A | 2/1994 | Herrera | |
| 5,303,970 A | 4/1994 | Young et al. | |
| 5,310,237 A * | 5/1994 | McCloy et al. | 296/37.7 |
| 5,599,086 A | 2/1997 | Dutta | |
| 5,823,599 A | 10/1998 | Gray | |
| 5,893,603 A | 4/1999 | Viertel et al. | |
| 5,927,784 A | 7/1999 | Vitito | |
| 5,954,252 A | 9/1999 | Gebreselassie et al. | |
| 6,019,411 A | 2/2000 | Carter et al. | |
| 6,062,623 A | 5/2000 | Lemmen | |
| 6,086,129 A | 7/2000 | Gray | |
| 6,092,704 A | 7/2000 | Baumeister | |
| 6,116,674 A | 9/2000 | Allison et al. | |
| 6,135,529 A | 10/2000 | De Angelis et al. | |
| 6,158,639 A | 12/2000 | De Silva et al. | |
| 6,158,795 A | 12/2000 | Gray et al. | |
| 6,176,536 B1 | 1/2001 | Miller et al. | |
| 6,203,088 B1 | 3/2001 | Fernandez et al. | |
| 6,234,570 B1 | 5/2001 | Quinno et al. | |
| 6,264,261 B1 | 7/2001 | Krafcik | |
| 6,267,428 B1 | 7/2001 | Baldas et al. | |
| 6,293,616 B1 | 9/2001 | Williams et al. | |
| 6,321,960 B1 | 11/2001 | Ellis et al. | |
| 6,338,517 B1 | 1/2002 | Canni et al. | |
| 6,575,528 B1 | 6/2003 | Tiesler et al. | |
| 6,619,716 B1 | 9/2003 | Sturt | |
| 6,669,260 B1 | 12/2003 | Clark et al. | |
| 6,749,244 B1 | 6/2004 | Song | |
| 6,824,185 B1 * | 11/2004 | Tiesler et al. | 296/37.8 |
| 6,827,384 B1 | 12/2004 | Anderson et al. | |
| 6,926,333 B1 * | 8/2005 | Sturt | 296/37.8 |
| 2001/0002253 A1 | 5/2001 | Farer et al. | |
| 2003/0098595 A1 | 5/2003 | Carter et al. | |
| 2004/0084920 A1 * | 5/2004 | Trimble et al. | 296/37.8 |
| 2004/0150252 A1 | 8/2004 | Schlachter et al. | |
| 2004/0155490 A1 | 8/2004 | Homann et al. | |
| 2004/0160072 A1 | 8/2004 | Carter et al. | |
| 2004/0169390 A1 | 9/2004 | Tiesler et al. | |
| 2005/0046240 A1 * | 3/2005 | Ozkok et al. | 296/210 |
| 2005/0116510 A1 * | 6/2005 | Leroy et al. | 296/216.01 |
| 2005/0212319 A1 * | 9/2005 | Gil et al. | 296/37.7 |

FOREIGN PATENT DOCUMENTS

| | | |
|---|---|---|
| DE | 31 51 098 A1 | 9/1983 |
| DE | 690 03 767 T2 | 2/1991 |
| DE | 41 16 758 A1 | 11/1992 |
| DE | 44 38 623 A1 | 11/1995 |
| DE | 198 22 638 A1 | 12/1999 |
| DE | 199 09 732 A1 | 9/2000 |
| DE | 201 03 563 U1 | 7/2001 |
| DE | 298 08 950 U1 | 8/2001 |
| EP | 0 178 196 B1 | 4/1986 |
| EP | 0 342 345 B1 | 7/1992 |
| EP | 0 795 437 A2 | 9/1997 |
| EP | 1 092 590 A1 | 4/2001 |
| GB | G 86 18 079 U1 | 4/1987 |
| JP | 57-167838 | 10/1982 |
| JP | 61-150237 | 7/1986 |
| JP | 09-058359 | 3/1997 |
| JP | 09-058360 | 3/1997 |
| JP | 09-058361 | 3/1997 |
| JP | 11-129827 | 5/1999 |
| JP | 2001-055091 | 2/2001 |
| WO | WO 99/48724 | 9/1999 |

* cited by examiner

TRANSPARENT VEHICLE ROOF WITH ARRANGEMENT FOR RECEIVING ARTICLES

FIELD OF THE INVENTION

The present invention relates to an overhead system for a vehicle. The present invention relates more particularly to an overhead system for a vehicle having a transparent roof portion. The present invention relates more particularly to an overhead system having elongated rails for at least partially supporting the transparent roof portion and which may receive modular articles for use within the vehicle.

BACKGROUND OF THE INVENTION

Vehicles such as motor vehicles having transparent roof portions in the form of fixed or movable glass panels are generally known and include "sun roofs," "moon roofs," etc. Such known sun roofs or moon roofs are typically configured as a window-like opening in a relatively small portion of the roof structure and are generally limited to the area between structural members of the vehicle roof such as crossbows or headers. Such known window-like openings typically provided a limited overhead view from the vehicle interior and are not practical for providing a panoramic overhead view from within the vehicle interior due to their limited size and constraints within the roof structure, and the need for structural strength within the roof panel. Further, such glass panels typically do not provide for attaching articles within the interior. Therefore, such known window like openings usually do not provide transparency for the entire roof portion or a substantial portion of the roof portion due to the structural requirements of a conventional roof and the presence of the cross bows, headers, or other structural support features of a conventional roof, and usually do not provide the adaptability to receive various articles for use by the vehicle occupants. Accordingly, due to advancement in interior vehicle design, it has become desirable to have roof panels that are transparent or partially transparent (e.g. glass, etc.) that cover either a large or small portion of the roof area and are adapted to receive articles for use by the vehicle occupants.

Overhead systems with modular storage compartments in the forward portion of vehicles are also generally known and include consoles and structures for mounting items such as lamps, small storage compartments and electronic instrumentation such as compasses, temperature displays and clocks. Such modular systems typically have mounting configurations that permanently attach such articles to a structural portion of the vehicle, whereby installation of article options are typically conducted in a factory setting during vehicle construction and often requires user-selection of the desired articles prior to vehicle assembly, or user acceptance of preinstalled option packages. However, such modular systems typically are mounted to the vehicle roof structure and rely on the roof structure for support and thus do not provide the structural strength or support for the roof portion.

Accordingly, it would be advantageous to provide an overhead system having a transparent panel covering a small portion or a substantial portion of the roof area. It would also be advantageous to provide a support structure for the transparent panel within the vehicle interior that is adaptable for other uses within the vehicle. It would also be advantageous to provide an overhead system with a mounting system configured for interchangeably mounting a wide array of selectively removable, user-oriented articles that are adapted for use within, or in conjunction with, a vehicle. It would also be advantageous to provide such an overhead system along substantially the entire length of the interior overhead portion of a vehicle. It would also be advantageous to provide an overhead system that provides concealed distribution of utilities from vehicle utility supply sources to the interchangeably selected articles. It would be further advantageous to provide an overhead system whereby certain classes of articles are capable of installation only in predetermined portions of a vehicle area to minimize potential distractions to a vehicle operator.

Accordingly, it would be advantageous to provide an overhead system for a vehicle having any one or more of these or other advantageous features.

SUMMARY OF THE INVENTION

The present invention relates to an overhead system for a vehicle, including a generally transparent panel covering a portion of the roof area of the vehicle and one or more elongated members adapted to engage at least one of the generally transparent panel and a structural portion of the vehicle, where the elongated member is adapted to receive at least one article for use within the vehicle.

The present invention also relates to a system for attaching articles to an overhead portion of an interior of a vehicle, including a generally transparent panel covering a portion of the roof area of the vehicle, at least one elongated member coupled to the generally transparent panel, and at least one article adapted for mounting to the elongated member.

The present invention further relates to an overhead system for a vehicle including at least one panel that is substantially see-through, and a rail system having at least one elongated member coupled to the panel.

DETAILED DESCRIPTION OF THE PREFERRED AND OTHER EXEMPLARY EMBODIMENTS

Figure 1:
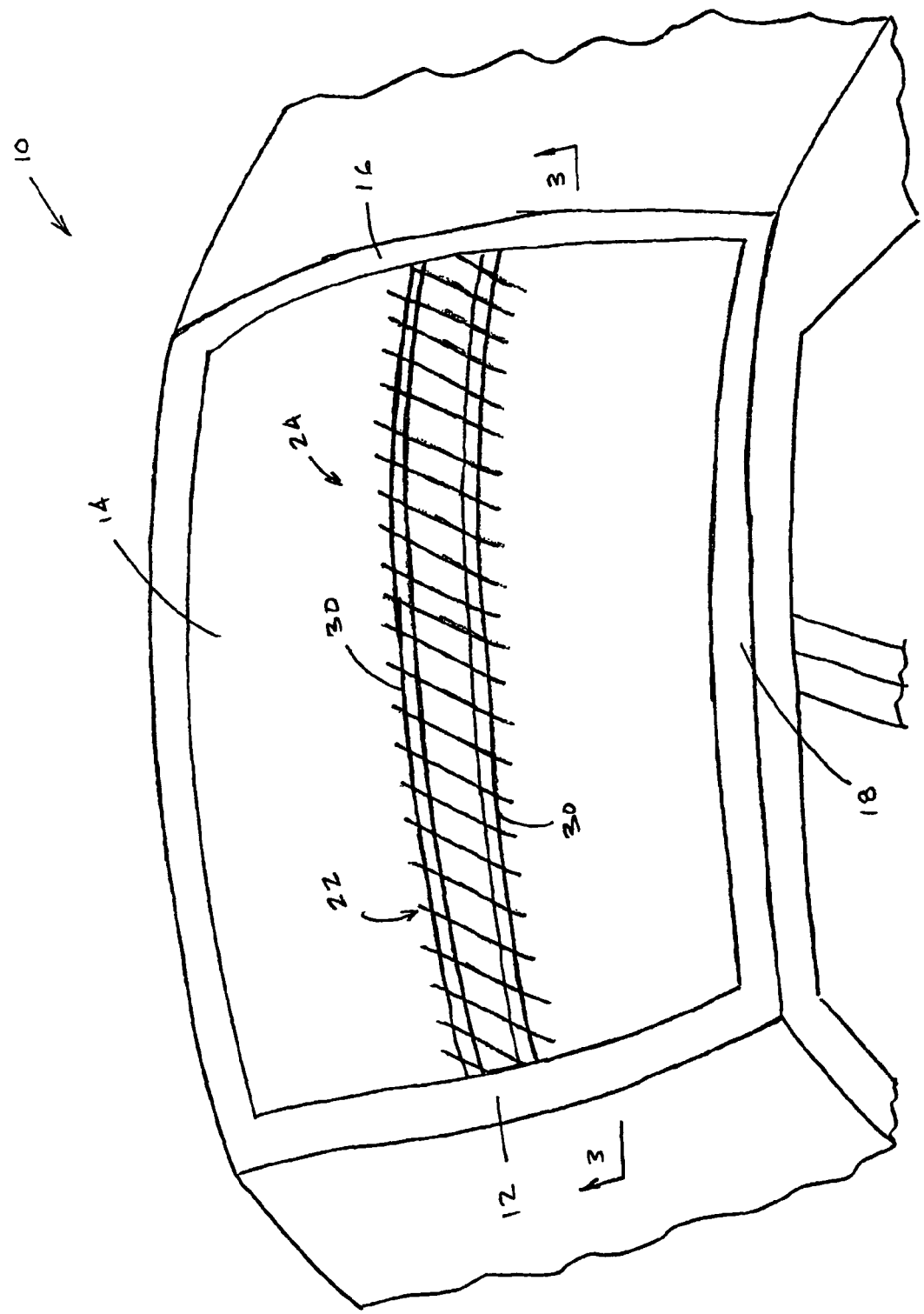
FIG. 1 is a downward-looking perspective view of an overhead system mounted for a vehicle according to a preferred embodiment.
Figure 2:
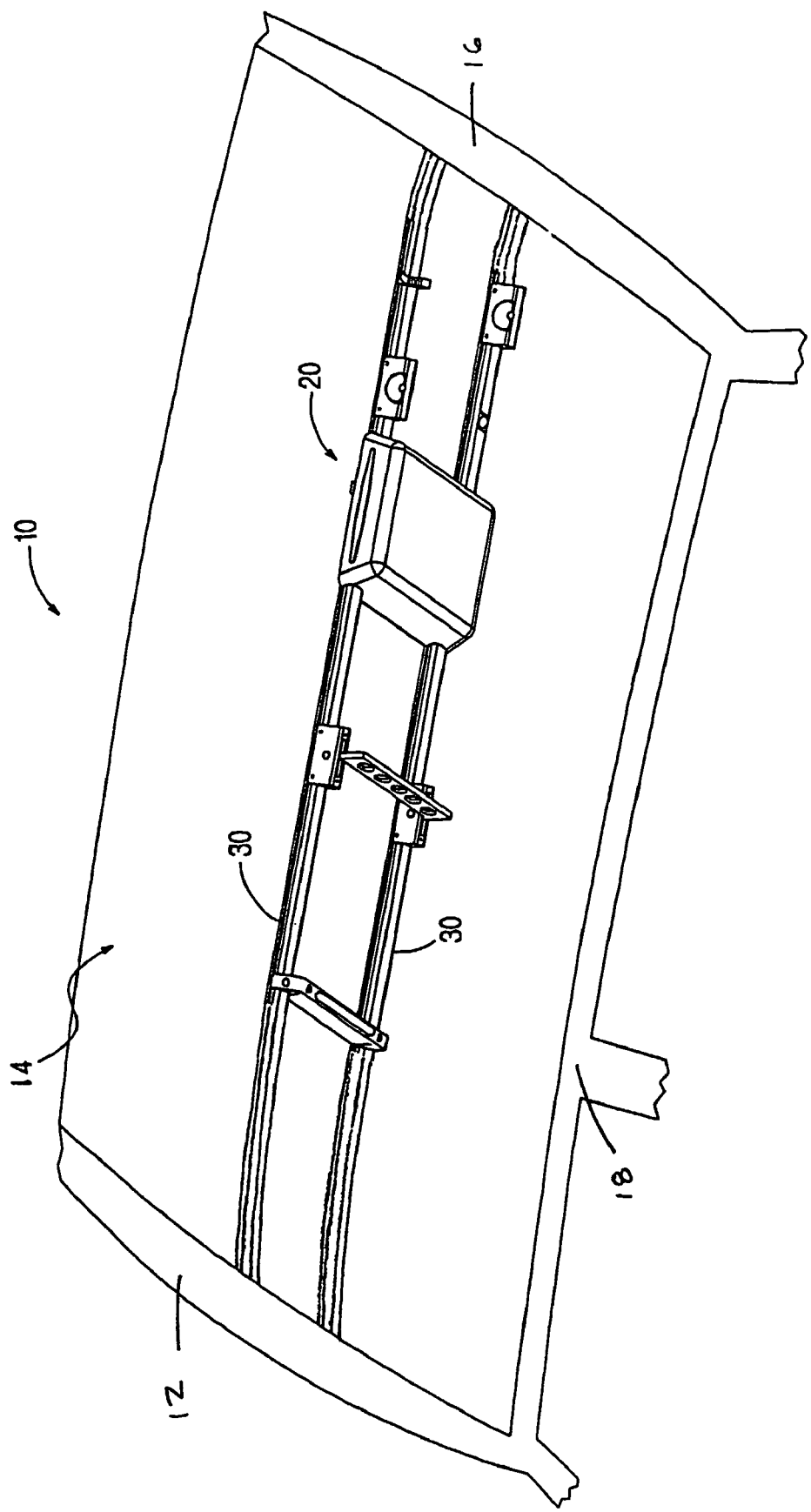
FIG. 2 is an upward looking perspective view of an overhead system for a vehicle according to a preferred embodiment.

Referring to FIGS. 1 and 2, an overhead system 10 is shown according to a preferred embodiment. Overhead system 10 includes a roof surface or panel 14 made from a generally transparent or see-through material (e.g. glass, polymer, resin, etc.) provided in an overhead roof portion or area of the vehicle and supported by one or more elongated members 30 (to be further described). The material of panel 14 may have suitable safety or structural features such as shatter-proof, safety glass, etc. Panel 14 may be sized to cover a substantial portion of the roof area to provide the occupants of the vehicle with a panoramic vista when viewing external surroundings from within the vehicle, or panel 14 may be provided in a smaller size such as are typically provided in sun roofs or smaller roof windows (not shown). Panel 14 may be generally flat, curved, or may be contoured into any desired shape to suit the styling, profile or design of the vehicle. The panel 14 may be provided in a clear material, or may be tinted, colored, reflective or provided with other visual modification features desired for the external vehicle appearance and the internal occupant viewing enhancement. For example, the panel may include photochromic, electrochromic or electro-chemochromic light filtration characteristics. The visual modification features may also be adapted to provide vehicle interior climate control features. For example, panel 14 may have tinted or reflective properties of have other suitable coatings or properties for minimizing the transmission of light or thermal energy into the vehicle cabin (e.g. minimizing "greenhouse effect") or may be substantially clear for maximizing the transfer of thermal energy into the vehicle cabin (e.g. for promoting a "greenhouse effect"). According to an alternative embodiment, the panel may be a see-though panel that includes a portion that is capable of opening (e.g. sunroof, etc.).

Referring further to FIGS. 1 and 2, panel 14 is supported and sealed around its perimeter by upper portions of the vehicle structure such as front header 12, rear header 16 and side pillars or columns 18. According to a particularly preferred embodiment, a mounting system 24 is provided having one or more elongated members 30 (shown schematically as rails, tracks, channels, rods, braces, etc.) to provide structural strength, rigidity and support to panel 14. Elongated members 30 may be designed with suitable strength characteristics to meet desired design standards for vehicle roofs (e.g. frontal, rear or side collision impact, roll-over, etc.). Elongated members 30 are shown fastened at a first end to a front roof header 12 and at a second end to a rear roof header 16 for supporting an interior portion of the panel 14 and for mounting one or more articles 20 (shown schematically as a compartment, exemplary articles will be further described herein). According to any exemplary embodiment, the elongated members may be used to provide a close-out structure for sunroofs located within the panel and may be used to assist in movement and closure of multi-panel roof systems. The mounting system may be supplied in a pre-attached configuration to the panel and may serve as a method to support and transfer the panel from a supplier through the process of assembling the vehicle. According to an alternative embodiment, panels may be provided that cover only a portion of the roof area, and the elongated members may be fastened to any suitable overhead structure in the vehicle including, for example, roof cross bows, headliner structures, etc. According to another alternative embodiment, the elongated members may be attached only to the panel such that they provide a mounting system and add rigidity to the panel. According to a further alternative embodiment, the panel may be of a size, shape or configuration where additional support is not required, and the elongated members may be non-structural members adapted to provide a mounting function for articles to the panel. According to any alternative embodiment, the panels may cover only a portion of the roof area may be supported by and sealed around the panel perimeter to a surrounding vehicle roof segment or other roof support structure.

Referring further to FIG. 1, panel 14 is shown according to any preferred embodiment and may be provided with a "shielded" section 22 (e.g. tinted, colored, blacked-out, etc.) to conceal or partially conceal the presence of the elongated members 30 when viewed from a location external to the vehicle. The shielded section 22 may have any suitable size and orientation adapted to provide shielding of the elongated members 30. According to any exemplary embodiment, the elongated members may be a single member or two or more members configured in a generally parallel manner and may be oriented longitudinally or laterally within the vehicle. The elongated members may be curved, straight, or have any suitable profile adapted to engage the panel to match the contours of the vehicle. In a further alternative embodiment, a shielded section may be omitted and the elongated members may be shaped or colored to provide a desired accessory appearance to the panel. In other alternative embodiments, the panel may be selectively removable from the vehicle, either with or without the elongated members, to provide an open or partially open vehicle environment.

Figure 3:
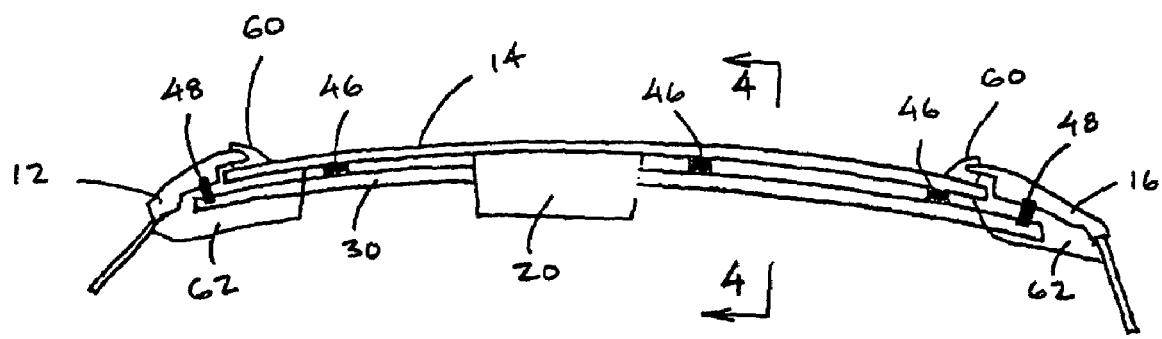
FIG. 3 is a cross sectional view of the overhead system for a vehicle along lines 3—3 of FIG. 1 according to a preferred embodiment.
Figure 4:
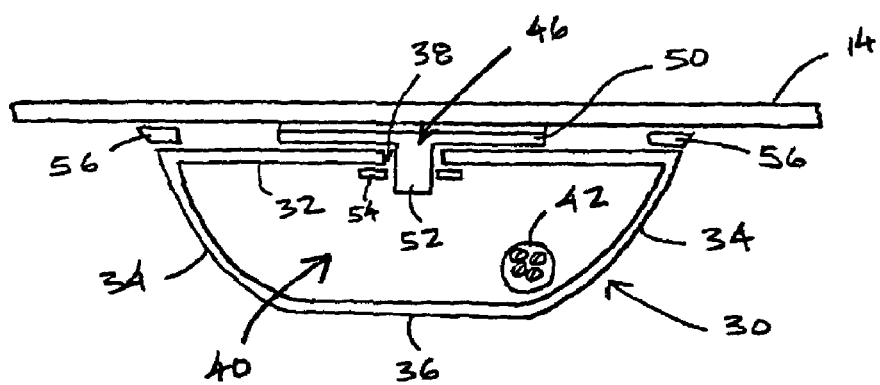
FIG. 4 is a cross sectional view of the overhead system for a vehicle along lines 4—4 of FIG. 3 according to a preferred embodiment.

Referring to FIGS. 3 and 4, the structural shape of elongated members 30 are shown according to one preferred embodiment. Elongated members 30 are shown having a generally hollow cross sectional shape (as shown in FIG. 4), and include a generally flat base 32 (e.g. back, contact surface, etc.) on the top of the elongated member 30. Base 32 is joined to side portions 34 that extend downward to a lower portion 36 to form a cross sectional shape of the elongated member (shown schematically as generally trapezoidal). The side portions 34 of the elongated member 30 may be curved, angled, or provided with notches or recesses adapted to receive articles 20. The lower portion 36 may be made as a detachable center strip or may be unitarily formed with the base 32 and side portions 34. In a particularly preferred embodiment, the elongated members are made from an acrylonitrile butiadene styrene (ABS) plastic in an extrusion process, and may be provided in a wide variety of colors designed to accent a vehicle trim or panel color scheme. According to an alternative embodiment, the elongated members and the cap may be made of aluminum or any other suitable material that provides the desired properties (e.g. strength, conductivity, weight, formability, etc.), wherein the elongated members or the cap may also serve as a conductor for transmitting low voltage electrical power from a vehicle supply source (not shown) to the articles mounted on the elongated members. According to another alternative embodiment, the cross sectional shape of the elongated member may have other forms such as I-beam shaped, circular, rectangular, triangular, half-moon shaped, etc.

The hollow shape of elongated members 30 provides a passageway 40 (e.g. channel, path, conduit, tunnel, etc.) through which utility carriers 42 such as wires, cables, fiber optics, etc. may be routed for distributing electrical power, data or communication signals to vehicle components or to the articles 20. According to a further alternative embodiment, the elongated members may be provided as a multi-piece structure (e.g. sections, segments, etc.) which may include connectors adapted to join the sections of the multi-piece structure as needed. Such connectors may include straight connectors, right angle connectors, and partial angle connectors.

As shown in FIG. 3, the longitudinal profile of the elongated members 30 may be contoured (e.g. arched, bowed, curved, angled etc.) to match the contour of the panel 14 along the entire length or a partial length of the panel 14, and to provide the desired support and strength properties. According to an alternative embodiment, the elongated members may be further provided with retaining structure to secure the location of articles mounted on the rails from moving in the event of a collision, rapid stops, or other abrupt vehicle maneuvers. Such retaining structure may be in the form of a series of slots, recesses, projections, hooks, high-friction surfaces or other structure or features designed to prevent the articles from shifting along the rails or unintentionally detaching from the rails. According to a further alternative embodiment, the elongated members may be provided with conductive features such as metallic strips or inserts that provide a conductive path for delivering utilities to the articles. Such conductive features may be provided along the length of the elongated member or may be configured to provide conductive windows or junction points at selected locations for interfacing with certain articles.

Referring to FIGS. 3 and 4, elongated members 30 are coupled to the panel 14 by connectors 46 at various positions along the panel 14 to provide structural support to the panel. The end portions of the elongated members are connected to the vehicle structure (shown schematically as front header 12 and rear header 16) by fasteners 48 (e.g. threaded fasteners, Z-axis clips, welding, brazing, rivets, etc.) to attach (e.g. fasten, fix, secure, anchor, etc.) the ends of the elongated members 30 to the vehicle. According to an alternative embodiment, the end portions of the elongated members may be removably attached to the vehicle structure to facilitate removal of the roof panel and the elongated members as a single unit. For example, connectors such as quick-disconnects, quarter-turn latches, buckles, slide-locks, over-center catches, etc. may be used to connect the ends of the elongated members to the vehicle.

Referring further to FIG. 3, the elongated members 30 are shown joined to the panel 14 by one or more connectors 46 positioned longitudinally along an interior segment of elongated member 30 and panel 14 to join the elongated members 30 to the panel 14. As shown schematically in FIG. 4, connectors 46 include a panel interface portion 50 configured for attachment to (and support of) the panel 14 by any suitable method shown as adhesive bonding, but may also include slide-fit, snap-fit, twist-lock connection, etc. or other suitable device to facilitate rapid installation techniques or decoupling of the elongated members 30 and panel 14. Connector 46 includes an extension portion 52 (e.g. post, projection, etc.) that extends downwardly and in a securing relationship with the base 32 of elongated member 30. Extension portion 52 includes a fastening section for joining the elongated member 30 and the panel 14. According to a particularly preferred embodiment, the fastening section of extension portion 52 is a threaded section that extends through an opening 38 in base 32 for engagement with a threaded collar 54. The laterally outward ends of elongated member 30 are fitted with a trim member 56 shown schematically as a gasket strip for providing a seal between the base 32 and the panel 14. Trim member 56 is preferably resilient and weather-resistant to accommodate the typical temperature changes associated with vehicle roof applications and may be made of a material such as rubber, polymer, foam, or other suitable gasket material. The trim member may be provided in any suitable shape or color to enhance the aesthetic appearance of the elongated member and panel. According to an alternative embodiment, the connector may be a friction-type or snap-fit connector, such as a Z-axis clip-type connector, finned-plug (e.g. Christmas tree connector) or other type of connector that is engagable by a press-fit or other quick-installation engagement. According to another alternative embodiment, the elongated members may provide contact-type support to the panel without the use of connectors to facilitate removal of the panel by a user to create an open or partially open vehicle top environment in which the elongated members and articles remain available for use by the vehicle user. According to an alternative embodiment, the elongated members may be chemically adhered to the panels (e.g. adhesives, chemical bonds, etc.).

Referring further to FIG. 3, suitable trim members 60 are provided around the perimeter of the panel 14 to seal the panel to the vehicle structure (shown schematically at the front and rear of the roof portion) according to a preferred embodiment. The trim members 60 may be any suitable sealing material such as rubber, polymer, resin materials, etc. and may be attached primarily to the perimeter of panel 14 or to the vehicle structure. A cover 62 (e.g. bezel, trim, molding, etc.) is preferably provided at each end of the elongated member 30 to provide a smooth and aesthetic appearance for the junction between the ends of the elongated members 30 and the vehicle structure. The covers may be attached directly to the vehicle structure (e.g. front header, rear header, headliner, etc.) or may be attached to the elongated members. According to an alternative embodiment, trim covers may be omitted and the elongated members may have end portions that are configured in a suitable shape or structure for housing vehicle functional elements such as instruments or for providing storage space.

Figure 5:
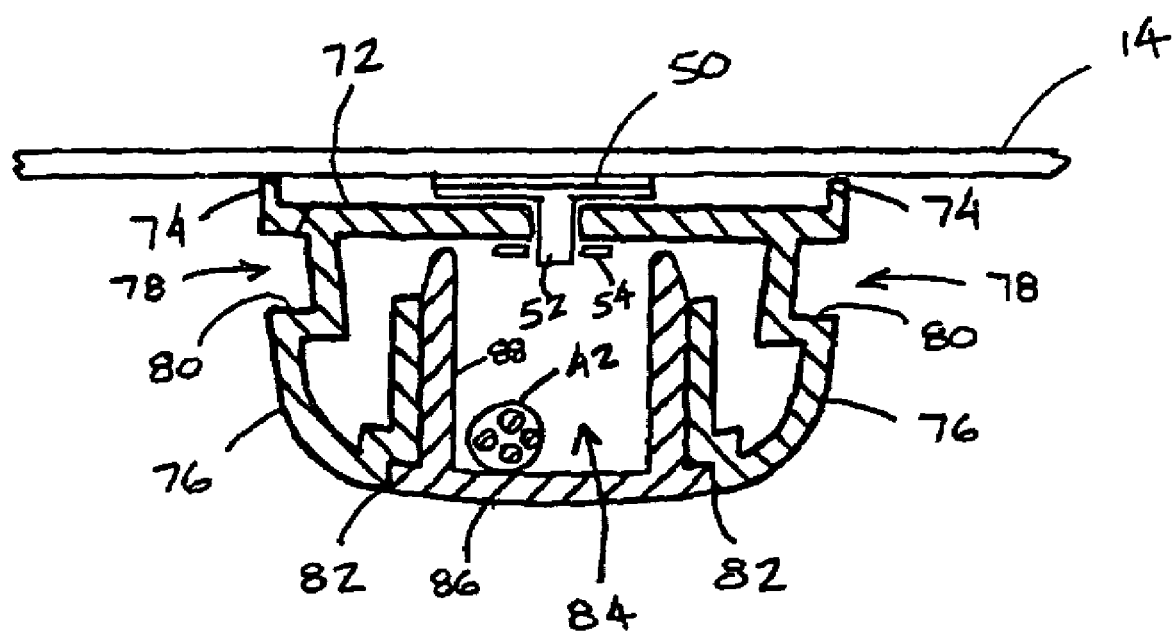
FIG. 5 is a cross sectional view of the overhead system for a vehicle along lines 4—4 of FIG. 3 according to another preferred embodiment.

Referring to FIG. 5, the structural shape of the elongated members are shown according to another exemplary embodiment. Elongated members 70 have a generally hollow cross sectional shape with a generally flat base 72 with several longitudinal ribs 74 projecting therefrom. Connectors 46 may be provided (as previously described) for joining the elongated members 70 to the panel 14 and fasteners may be provided (as previously described) for joining the elongated member 70 to the vehicle structure. Ribs 74 are provided at the outward lateral edges of elongated member 70 to trim the space between the base 72 and the panel 14. Elongated members 70 further include sides 76 having a recess 78 (e.g. notch, inset, slot, groove, channel, etc.) forming an outwardly projecting supporting ledge 80 (e.g. corner, shoulder, edge, etc.). Recesses 78 and ledges 80 provide an external structure for receiving and supporting the articles 20 (shown schematically) having corresponding structure adapted to mate with ledges 80. According to a particularly preferred embodiment, ledge 80 is horizontal (as shown) and ledge 80 and recess 78 are formed having an angle of 90 degrees or less for providing a structure for receiving articles 20. According to an alternative embodiment, the elongated member may have a circular cross sectional shape (not shown) or any other shape where the exterior surface is configured to provide longitudinal recesses and ledges for receiving and supporting the articles. According to another alternative embodiment, the elongated member may have a second recess and ledge (not shown) for providing an alternative article mounting interface and providing structure adaptable for mounting interlocks that may prohibit or allow installation of certain articles along particular locations of the elongated members. According to a further alternative embodiment, the members may be provided with a series or pattern of apertures (e.g. holes, slots) or other structure such as ribs, serrations, etc. that are intended to engage corresponding structure on the articles and intended to prevent the articles from sliding or otherwise shifting position along the members when the articles are attached to the members (such as during abrupt vehicle maneuvers, rapid accelerations or deceleration, collisions, etc.). For example, such apertures may be configured to correspond to one or more projections or extensions on the article (e.g. "teeth," etc.) when the article is attached to the member. Such apertures may also have different shapes or locations along the member to serve as an interface so that certain articles are capable of attachment to the members only at certain predetermined or preauthorized locations on the member.

Referring further to FIG. 5, a system for distributing electricity and/or data and communication signals is shown according to an exemplary embodiment. Beneath ledges 80, sides 76 include inwardly curved lower sections that terminate into a return bend providing internal corners 82 to create a longitudinal opening 84. Opening 84 creates a passage (e.g. channel, path, conduit, tunnel, etc.) within elongated member 70 for routing utility carriers such as wires, cables, fiber optics, etc. A removable cap 86 is provided generally along the entire length of elongated member 70 to cover opening 84 and retain utility carriers, and may have a flush fit with elongated member 70, or may have projecting contours, ribs, or other decorative or useful structure (not shown). Cap 86 includes two inwardly projecting legs 88 that fit within opening 84 and are removably retained in place by an interference type, snap-fit engagement. Opening 84 may be entirely or partially concealed by inserting one or more caps 86 having segments of various lengths tailored to create an access pattern within elongated members 70. The access pattern may be created or modified at any time for selectively providing access to opening 84 along the length of elongated member 70. Elongated member 70 and cap 86 may be made of acrylonitrile butiadene styrene (ABS) plastic in an extrusion process, and may be provided in a wide variety of colors designed to accent an interior trim color scheme. According to an alternative embodiment, the elongated members and the cap may be made of aluminum or any other suitable material, wherein the elongated members or the cap may also serve as a conductor for transmitting low voltage electrical power from a vehicle supply source (not shown) to the articles mounted on the elongated members. For applications where the elongated members are made of aluminum, the outer surface of the aluminum is preferably anodized which provides an insulating layer on the exterior of the elongated member 70, which may be selectively removed to provide a custom-tailored electrical conductivity access pattern. Portions of elongated members 70 and cap 86 that are not otherwise enclosed by articles 20 may also have a separate insulating cover (not shown) that snap fits into recesses 78 and ledges 80 to electrically isolate elongated members 70 from consumer contact or inadvertent contact with an electrical ground. Elongated members 70 and cap 86 may also be made of any other material suitable for forming an elongated support member and receiving mounting structure from articles 20 to be supported therefrom.

Referring further to FIG. 2, a variety of articles 20 may be mounted to elongated members 30, 70 according to a preferred embodiment. Articles 20 may include storage compartments (with or without key-lock access control) tailored to hold tissues, sunglasses, remote control devices, wireless phones, pagers, personal data assistants (PDA), walkie-talkies, binoculars, cameras, first aid or road-side emergency kits, tools, baby-care products and supplies, arts and crafts supplies, toys, sporting goods, books, maps, hunting and fishing equipment, and many other articles for which readily accessible storage in a vehicle may be useful. Such storage compartments may either be fixed or designed for pull-down, drop-down or rotational access where the compartment is recessed during storage and extended for access during usage. Articles 20 may also include handles, brackets, fixtures (e.g. "starter block") for mounting racks, cages, or support pillars for optionally receiving members to mount additional articles 20 in a cargo area, lighting equipment, power adapters and outlets, lighters; visual display screens; audio equipment; media displays; digital video disc players; GPS receivers; cargo storage racks, straps or tie-downs; garment hangers, rods or racks; insulated hot or cold-storage containers, mobile office workstation components, portable air compressors or vacuum cleaners, cargo netting and holders; occupant safety features; specially-adapted consumer-use products such as travel tables, camping gear, pet barriers, luggage, etc.; brackets having rigid, swiveling or rotating couplers for removably receiving such consumer use products; storage racks having fixed or retractable support members for storing skis or other gear; and any other articles which may be useful in conjunction with traveling, working or other vehicle use.

Articles 20 are adapted to be selectively positionable along elongated members 30, 70 however, articles that may be deemed to create a distraction to the vehicle operator, such as video displays and the like, are preferably provided with a mounting interlock feature which prevents installation in certain prohibited positions along the members, for example, allowing video monitors to be installed only in a rearward portion of the vehicle. The interlock function may be accomplished by altering the cross sectional shape or profile of a portion of the elongated members (not shown) or providing a second recess and ledge (not shown). Particular articles 20 may be provided with a mounting profile for engaging the elongated members 30, 70 that includes a projection (not shown) that extends into passage 78 whereby installation of a blank (not shown) within a particular portion of opening 40, 84 along elongated member 30, 70 will prevent mounting such articles in the selected locations. Alternatively installation of articles may be selectively restricted by otherwise altering the profile of the elongated members to fit only selected article mounting profiles and may be accomplished by adding a shim (not shown) along one or more sides of elongated member 30, 70 or in connection with the passageway of the member.

In yet another embodiment, the articles may be provided with fasteners (e.g. set screws, quarter-turn locks, slide locks, over-center catches, etc.) that may be loosened for installation of article 20 on elongated members 30, 70 and then the fastener may be tightened to secure the article to the member, or loosened for subsequent repair, replacement, or reorientation of the article within the vehicle. The fasteners may have suitable structure, such as projections in the form of "teeth" for coacting with mating apertures provided on the member to secure the position of the article with respect to the member.

Utilities may be distributed from a vehicle supply source (such as a conventional battery or distribution bus—not shown) via utility carriers 42 (e.g. wires, cables, fiber optics, ribbon conductors, etc.) that interface with articles 20. The utility carriers 42 may be distributed throughout system 10 by routing the utility carriers 42 through passage 40, 84 in elongated members so that the utility carriers 42 are concealed. Articles 20 are mounted over elongated members 30, 70, whereby one or more gaps or other openings corresponding to access and egress locations for the utility carriers 42, interfacing with articles 20 may be provided behind article 20, to create a utilities access pattern. The access pattern is adaptable to future changes or modifications in the article selection package by making suitable changes in the elongated members 30, 70. Articles 20 and utility carriers 42 may be provided with mating connectors (not shown) to facilitate ease of installation, replacement or reconfiguration of articles 20 within the system 10. According to an alternative embodiment, articles 20 may be provided with a fixed length of utility carrier for routing through passage 40, 84 to the vehicle supply source. To provide additional flexibility in distributing utilities to various articles, an article 20 may be configured to serve as a utility storage or junction box for housing additional utility distribution devices or components and for storing excess quantities of utility carrier that may be desirable for accommodating future changes to the article selection package.

According to any exemplary embodiment, low-voltage electrical power in the range of approximately 12–42 volts DC or other suitable voltage range for powering articles may be routed to the articles via the elongated members, where the elongated members are fabricated entirely or partially from aluminum or other electrically conductive material. The elongated members may also be fabricated from a non-conducting material such as plastic, where a conducting material such as copper or aluminum is integrally formed with the elongated member in the shape of a longitudinal conducting strip, rail or bar (not shown) to provide a uniform electric current access path from the vehicle supply source to the articles. Such conducting material may be affixed to the elongated member by ultrasonic welding, molding, interference-type snap insert, vacuum metallization or other suitable process. The articles are provided with an electrically conductive contactor that projects outwardly from a surface of the article and is configured to contact the elongated member or a conducting strip thereon and remains concealed between the elongated member and the article when the article is installed on the elongated member to provide a conductive electrical path to the article. The contactor may be spring-biased for urging the contactor into continuous contact with the elongated member or a conducting strip when the article is mounted on the elongated member. In a preferred embodiment where a system with two parallel members are used, one elongated member would have a positive electrical polarity (i.e. battery potential) and the second elongated member would have a negative electrical polarity (i.e. ground). For embodiments using a single member, two longitudinal conducting strips (not shown) may be used on the elongated member to provide positive and negative conductors, corresponding to appropriately positioned contactors on an article configured to mount to a single elongated member.

Conducting strips (not shown) may be used as an article positioning interlock along the elongated members by altering the conducting strip longitudinal position along the elongated member to provide a power interlock profile. The power interlock profile ensures that contactors for certain articles will properly interface with the conducting strips only when articles are installed at locations on the elongated members corresponding to a mating conducting strip position. For example, video display articles may have contactors positioned to match a conducting strip position corresponding only to a location rearward of the front seats of the vehicle. Similarly, other consumer articles that may create a distraction to a vehicle operator may be electrically interlocked so that they are operable only when installed in positions that are preestablished by the power interlock profile. Insulating cover segments may be provided that are adapted to cover portions of the elongated members that remain exposed after installation of the article selection package to prevent consumer exposure or electrical shorts to ground with the energized portions of the system.

According to other alternative embodiments, the articles may receive communication and/or data signals and the like in a wireless manner (such as RF, infrared, etc.) from a device such as a transmitter or control station positioned within the vehicle and configured to interact with the articles.

It is important to note that the construction and arrangement of the elements of the overhead system for a vehicle provided herein is illustrative only. Although only a few exemplary embodiments of the present invention have been described in detail in this disclosure, those skilled in the art who review this disclosure will readily appreciate that many modifications are possible in these embodiments (such as variations in installation location and orientation within a vehicle, sizes, structures, shapes and proportions of the various elements, mounting arrangements, use of materials, colors, combinations of shapes, etc.) without materially departing from the novel teachings and advantages of the invention. For example, the overhead system may be used in the interior of any vehicle (such as an automobile, truck, sport utility vehicle, van, boat, airplane, train, construction or farming equipment, tractor trailer trucks, motor homes and recreational vehicles, etc.). According to other alternative embodiments, the overhead system may be used in connection with articles such as camping gear that are designed to adapt to a stationary vehicle environment. Further, it is readily apparent that the panel may be provided in any shape, size, or with any material or light transmission characteristics, and may cover either a small area or a substantial area of the vehicle roof. It is also readily apparent that the elongated members may be provided in a wide variety of strength characteristics, profile curvatures, shapes, sizes, thickness, and engagement profiles and adapted for installation along, or in conjunction with, the roof panel of the vehicle. The elongated members may provide structure, support or strength to the panel, or may serve solely to provide an attachment interface between the panels and various articles. It is also readily apparent that the articles may be designed with any profile suitable for attaching to one or more elongated members and may be adapted for slidable movement or fixed installation along the elongated members. Accordingly, all such modifications are intended to be within the scope of the invention as defined in the appended claims.

The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating configuration and arrangement of the preferred and other exemplary embodiments without departing from the spirit of the present inventions as expressed in the appended claims.

What is claimed is:

1. An overhead system for a vehicle, comprising:
    a substantially transparent panel adapted to cover a portion of a roof area of the vehicle;
    at least one elongated member adapted to couple to at least one of the substantially transparent panel and a structural portion of the vehicle;
    wherein the elongated member is configured to receive at least one article for use within the vehicle.
2. The overhead system of claim 1 wherein the elongated member is coupled to the substantially transparent panel and to the structural portion of the vehicle.

3. The overhead system of claim 1 wherein the substantially transparent panel is adapted to cover substantially all of the roof portion of the vehicle.

4. The overhead system of claim 1 wherein the substantially transparent panel comprises a shielded section configured to at least partially conceal the presence of the elongated member.

5. The overhead system of claim 1 wherein the elongated member is at least partially conductive for transmission of electricity.

6. The overhead system of claim 1 wherein the elongated member comprises a passageway for routing utility carriers to the article.

7. The overhead system of claim 1 wherein the substantially transparent panel is formed in a shape having a contour and the elongated member is formed having a profile adapted to fit the contour.

8. The overhead system of claim 1 wherein the elongated member comprises a recess adapted to receive a fastener provided on the article for releasably securing the article to the elongated member.

9. The overhead system of claim 1 wherein the elongated member includes an interlock to permit placement of articles on the elongated members only at certain predetermined locations.

10. The overhead system of claim 1 wherein the substantially transparent panel includes at least one of a photochromic, an electrochomic and an eletrochemochromic light filtration device.

11. The overhead system of claim 1 wherein the substantially transparent panel comprises a portion that is capable of opening.

12. The overhead system of claim 1 wherein the substantially transparent panel is removable.

13. The overhead system of claim 1 further comprising a trim piece interfacing with the substantially transparent panel and the elongated member.

14. The overhead system of claim 1 wherein the elongated members are a multi-piece structure.

15. The overhead system of claim 1 wherein the elongated members are removably attached to the vehicle by a quick-disconnect device.

16. The overhead system of claim 1 wherein the elongated member comprises a plurality of apertures configured for engagement with at least one projection coupled to the article.

* * * * *